United States Patent
Fronk

[19]

[11] Patent Number: 6,065,428
[45] Date of Patent: May 23, 2000

[54] PET DISH INSECT BARRIER

[76] Inventor: Lawrence B. Fronk, 4816 S. 3900 W., Roy, Utah 84067

[21] Appl. No.: 09/244,405

[22] Filed: Feb. 4, 1999

[51] Int. Cl.[7] ..................................................... A01K 5/00
[52] U.S. Cl. ................................................................. 119/61
[58] Field of Search ............................. 119/61, 51.5, 72, 119/74; 43/124, 131, 132.1, 133, 136

[56] References Cited

U.S. PATENT DOCUMENTS

| | | | |
|---|---|---|---|
| 3,441,003 | 4/1969 | du Mond et al. | 119/61 |
| 4,803,954 | 2/1989 | Welch et al. | 119/61 |
| 5,031,575 | 7/1991 | Phillips | 119/61 |
| 5,069,166 | 12/1991 | Ahuna | 119/61 |
| 5,647,299 | 7/1997 | Pearson-Falcon | 119/61 |
| 5,794,564 | 8/1998 | Paro | 119/61 |

*Primary Examiner*—Thomas Price

[57] ABSTRACT

A pet dish insect barrier for preventing ground crawling insects from climbing into a pet dish. The pet dish insect barrier includes a pedestal having spaced apart top and bottom portions, and a constricted middle portion interposed between the top and bottom portions of the pedestal. A lower face of the top portion of the pedestal has a plurality of channels positioned between the outer perimeter of the top portion and the outer side of the middle portion and extending around an outer side of the middle portion. The outer side of the middle portion has a strip therearound, the strip has an insecticide provided thereon for repelling insects.

19 Claims, 3 Drawing Sheets

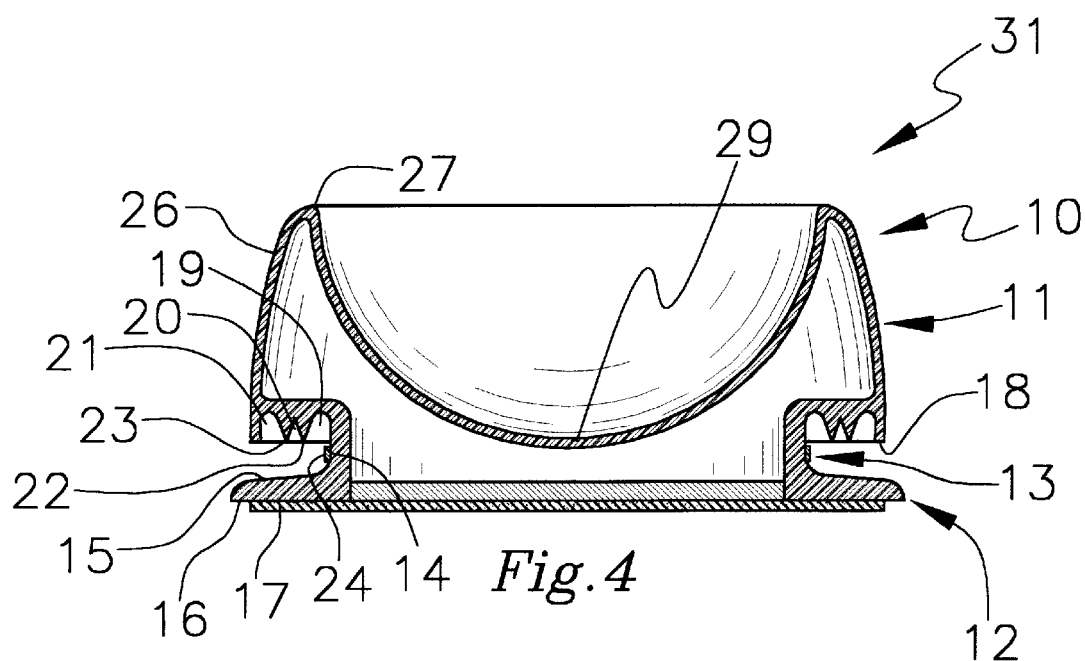
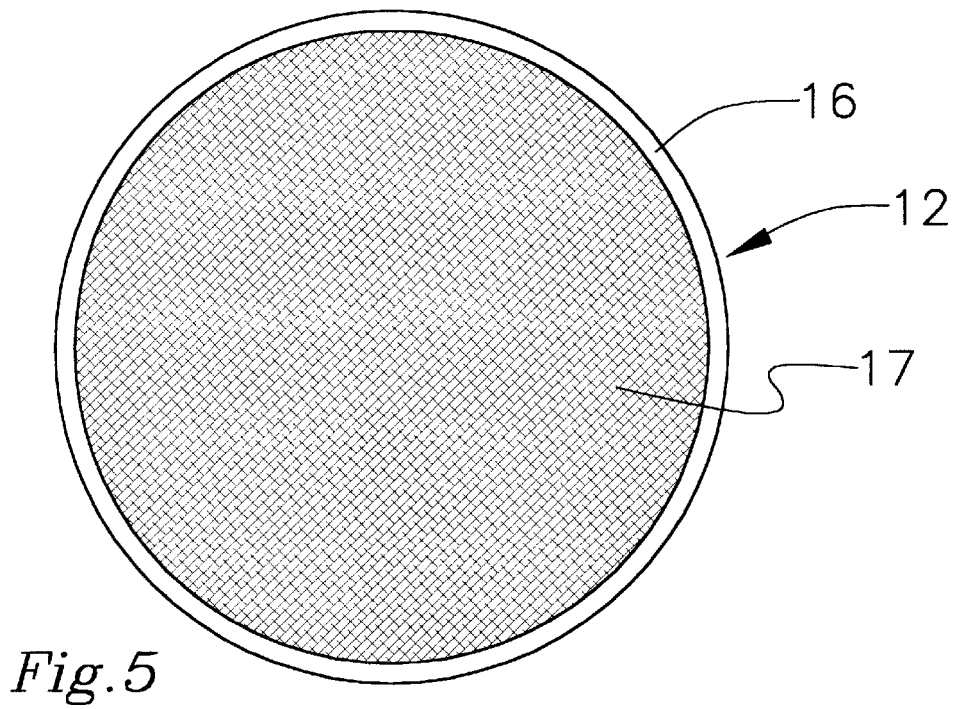

PET DISH INSECT BARRIER

BACKGROUND OF THE INVENTION

1. Field of the Invention

The present invention relates to pet dish insect barriers and more particularly pertains to a new pet dish insect barrier for preventing ground crawling insects from climbing into a pet dish.

2. Description of the Prior Art

The use of pet dish insect barriers is known in the prior art. More specifically, pet dish insect barriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,109,800 by Williams; U.S. Pat. No. 4,802,302 by Alnafissa; U.S. Pat. No. 5,730,083 by Walker; U.S. Pat. No. Des. 342,352; U.S. Pat. No. 2,167,978 by Jennerich; and U.S. Pat. No. 3,195,510 by Bernstein.

While these devices fulfill their respective, particular objectives and requirements, the aforementioned patents do not disclose a new pet dish insect barrier. The inventive device includes a pedestal having spaced apart top and bottom portions, and a constricted middle portion interposed between the top and bottom portions of the pedestal. A lower face of the top portion of the pedestal has a plurality of channels positioned between the outer perimeter of the top portion and the outer side of the middle portion and extending around an outer side of the middle portion. The outer side of the middle portion has a strip therearound, the strip has an insecticide provided thereon for repelling insects.

In these respects, the pet dish insect barrier according to the present invention substantially departs from the conventional concepts and designs of the prior art, and in so doing provides an apparatus primarily developed for the purpose of preventing ground crawling insects from climbing into a pet dish.

SUMMARY OF THE INVENTION

In view of the foregoing disadvantages inherent in the known types of pet dish insect barriers now present in the prior art, the present invention provides a new pet dish insect barrier construction wherein the same can be utilized for preventing ground crawling insects from climbing into a pet dish.

The general purpose of the present invention, which will be described subsequently in greater detail, is to provide a new pet dish insect barrier apparatus and method which has many of the advantages of the pet dish insect barriers mentioned heretofore and many novel features that result in a new pet dish insect barrier which is not anticipated, rendered obvious, suggested, or even implied by any of the prior art pet dish insect barriers, either alone or in any combination thereof.

To attain this, the present invention generally comprises a pedestal having spaced apart top and bottom portions, and a constricted middle portion interposed between the top and bottom portions of the pedestal. A lower face of the top portion of the pedestal has a plurality of channels positioned between the outer perimeter of the top portion and the outer side of the middle portion and extending around an outer side of the middle portion. The outer side of the middle portion has a strip therearound, the strip has an insecticide provided thereon for repelling insects.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pet dish insect barrier apparatus and method which has many of the advantages of the pet dish insect barriers mentioned heretofore and many novel features that result in a new pet dish insect barrier which is not anticipated, rendered obvious, suggested, or even implied by any of the prior art pet dish insect barriers, either alone or in any combination thereof.

It is another object of the present invention to provide a new pet dish insect barrier which may be easily and efficiently manufactured and marketed.

It is a further object of the present invention to provide a new pet dish insect barrier which is of a durable and reliable construction.

An even further object of the present invention is to provide a new pet dish insect barrier which is susceptible of a low cost of manufacture with regard to both materials and labor, and which accordingly is then susceptible of low prices of sale to the consuming public, thereby making such pet dish insect barrier economically available to the buying public.

Still yet another object of the present invention is to provide a new pet dish insect barrier which provides in the apparatuses and methods of the prior art some of the advantages thereof, while simultaneously overcoming some of the disadvantages normally associated therewith.

Still another object of the present invention is to provide a new pet dish insect barrier for preventing ground crawling insects from climbing into a pet dish.

Yet another object of the present invention is to provide a new pet dish insect barrier which includes a pedestal having spaced apart top and bottom portions, and a constricted middle portion interposed between the top and bottom portions of the pedestal. A lower face of the top portion of the pedestal has a plurality of channels positioned between the outer perimeter of the top portion and the outer side of the middle portion and extending around an outer side of the middle portion. The outer side of the middle portion has a strip therearound, the strip has an insecticide provided thereon for repelling insects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic cross-sectional view of the second preferred embodiment of the present invention.

FIG. 5 is a schematic bottom view of the present invention.

DESCRIPTION OF THE PREFERRED EMBODIMENT

Figure 1:
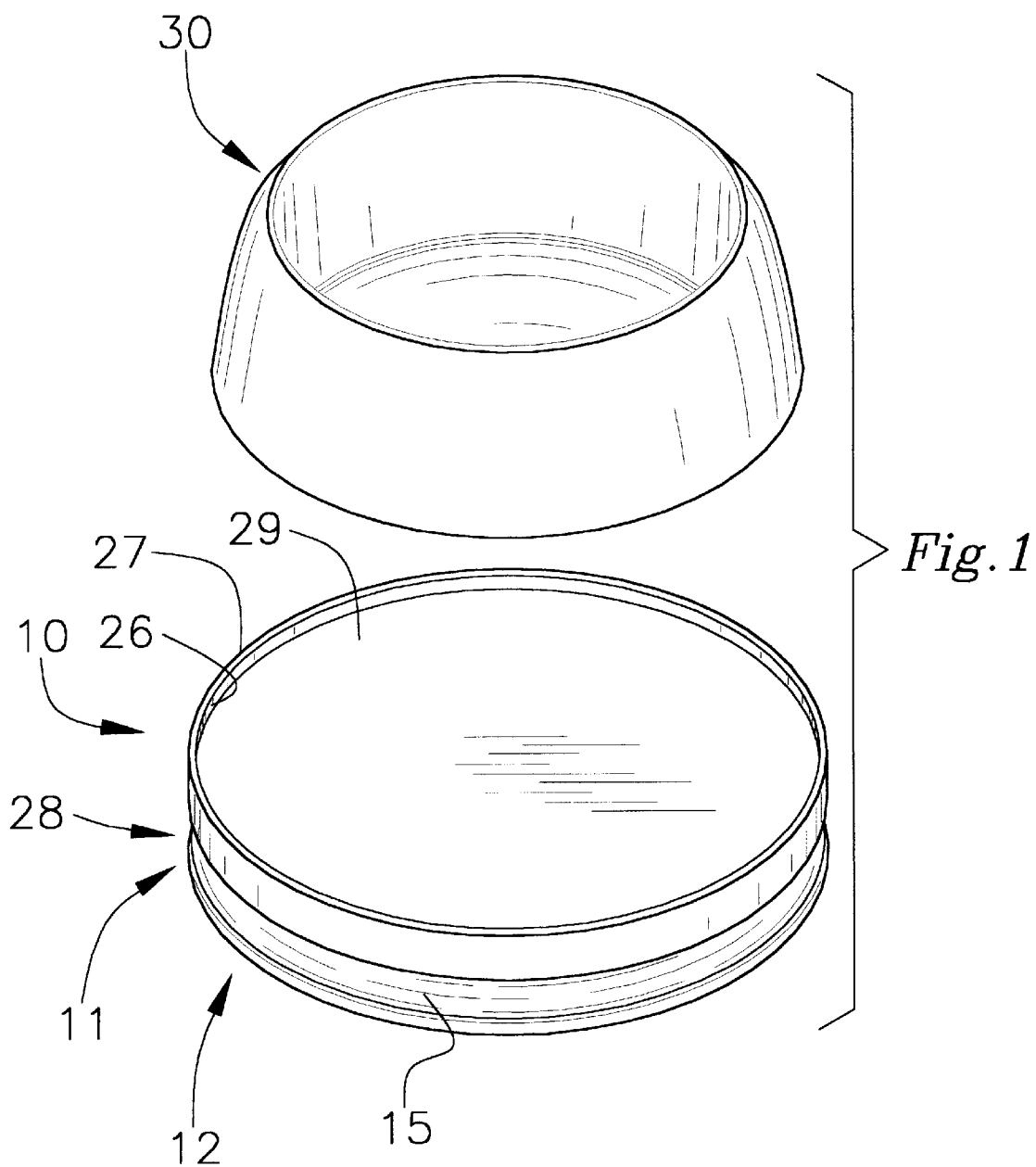
FIG. 1 is a schematic exploded perspective view of a first preferred embodiment of a new pet dish insect barrier according to the present invention.

With reference now to the drawings, and in particular to FIGS. 1 through 5 thereof, a new pet dish insect barrier embodying the principles and concepts of the present invention will be described.

As best illustrated in FIGS. 1 through 5, the pet dish insect barrier generally comprises a pedestal having spaced apart top and bottom portions, and a constricted middle portion interposed between the top and bottom portions of the pedestal. A lower face of the top portion of the pedestal has a plurality of channels positioned between the outer perimeter of the top portion and the outer side of the middle portion and extending around an outer side of the middle portion. The outer side of the middle portion has a strip therearound, the strip has an insecticide provided thereon for repelling insects.

In closer detail, the pet dish insect barrier comprises a pedestal 10 having spaced apart top and bottom portions 11,12, and a constricted middle portion 13 interposed between the top and bottom portions of the pedestal 28. The top, bottom portions of the pedestal each have an outer perimeter, and upper and lower faces. In a preferred embodiment, the outer perimeters of the top and bottom portions have about equal dimensions. The middle portion of the pedestal has an outer side 14 extending therearound. In one ideal embodiment, the outer perimeters of the top and bottom portions each are generally circular and has about equal outer diameters. In this embodiment, the outer side of the middle portion is also generally cylindrical. Preferably, the top, bottom, and middle portions has substantially coaxial centers in this embodiment. Optionally, the outer perimeters of the top and bottom portions each may be generally rectangular or oval.

The lower faces of the top and bottom portions preferably lie in generally parallel planes to each other. The upper face 15 of the bottom portion preferably slopes upwards from the outer perimeter of the bottom portion towards the outer side of the middle portion. This helps make it more difficult for insects to crawl on the upper face of the bottom portion.

In use, the lower face 16 of the bottom portion is designed for resting on a resting surface. Ideally, the lower face of the bottom portion has a disk-shape resiliently deformable pad 17 coupled thereto for frictionally enhancing contact between the lower face of the bottom portion and the resting surface. The pad preferably comprises a resiliently compressible rubber or plastic material. As best illustrated in FIG. 5, the pad preferably has a diameter less than the outer diameter of the bottom portion.

Figure 2:
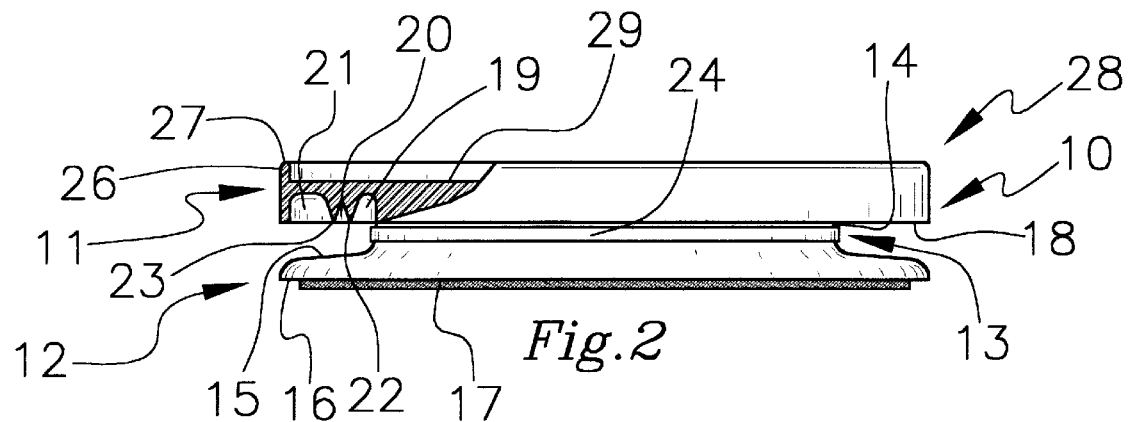
FIG. 2 is a schematic partial breakaway side view of the first preferred embodiment of the present invention.

With reference to FIGS. 2 and 4, the lower face 18 of the top portion of the pedestal has three annular channels 19,20,21 positioned between the outer perimeter of the top portion and the outer side of the middle portion and extending around the outer side of the middle portion. These channels are designed for providing a barrier to insects crawling from the middle portion across the lower face of the top portion. Preferably, the channels each have a depth defined upwards from lower face of the top portion, the depths of the channels is substantially equal to one another.

A first of the channels 19 has a generally inverted U-shaped transverse cross section comprising a spaced apart pair of side portions and an arcuate upper connecting portion connecting the side portions of the first channel together. The side portions of the first channel are preferably extended at an acute angle from one another with one of the side portions of the first channel extending substantially perpendicular to the lower face of the top portion.

A second of the channels 20 has a generally inverted V-shape transverse cross section comprising a pair of side portions extending at an acute angle from one another.

A third of the channels 21 has a generally inverted U-shaped transverse cross section comprising a spaced apart pair of side portions and an arcuate upper connecting portion connecting the side portions of the third channel together. The side portions of the third channel are preferably extended at an acute angle from one another with one of the side portions of the third channel extending substantially perpendicular to the lower face of the top portion.

The second channel is interposed between the first and third channels with the first channel positioned adjacent the outer side of the middle portion of the pedestal and the third channel positioned adjacent the outer perimeter of the top portion of the pedestal. One of the side portions of the first channel and a first of the side portions of the second channel converge together at the lower face of the top portion to form a first pointed ridge 22 between the first and second channels designed for making it difficult for insects to cross the lower face of the top portion. Similarly, one of the side portions of the third channel and a second of the side portions of the second channel converge together at the lower face of the top portion to form a second pointed ridge 23 between the second and third channels designed for making it difficult for insects to cross the lower face of the top portion.

The outer side of the middle portion has an annular strip 24 therearound which has an insecticide provided thereon for repelling insects trying to climb the outer side of the middle portion. Ideally, the annular strip has an adhesively attached cover sheet 25 therearound that when removed exposes the insecticide on the strip. Ideally, the top and bottom portions are spaced apart about ½ inch to make it harder for a pet to have access to the strip.

The top portion of the pedestal has an upwardly extending perimeter side wall 26 around the upper face of the top portion. The perimeter side wall of the top portion terminates at an upper edge 27 therearound which preferably lies in a plane substantially parallel to the plane of lower face of the top portion.

With reference to FIGS. 1 and 2, in a first preferred embodiment the upper face 29 of the top portion is substantially planar and lies in a plane substantially parallel to the lower face of the top portion and is positioned between the planes of the lower face of the top portion and the upper edge of the perimeter side wall of the top portion. In use, an existing pet dish 30 is rested on the upper face of the top portion such that the perimeter side wall of the top portion extends around the pet dish to help prevent the pet dish from is knocked off of the pedestal.

Figure 3:
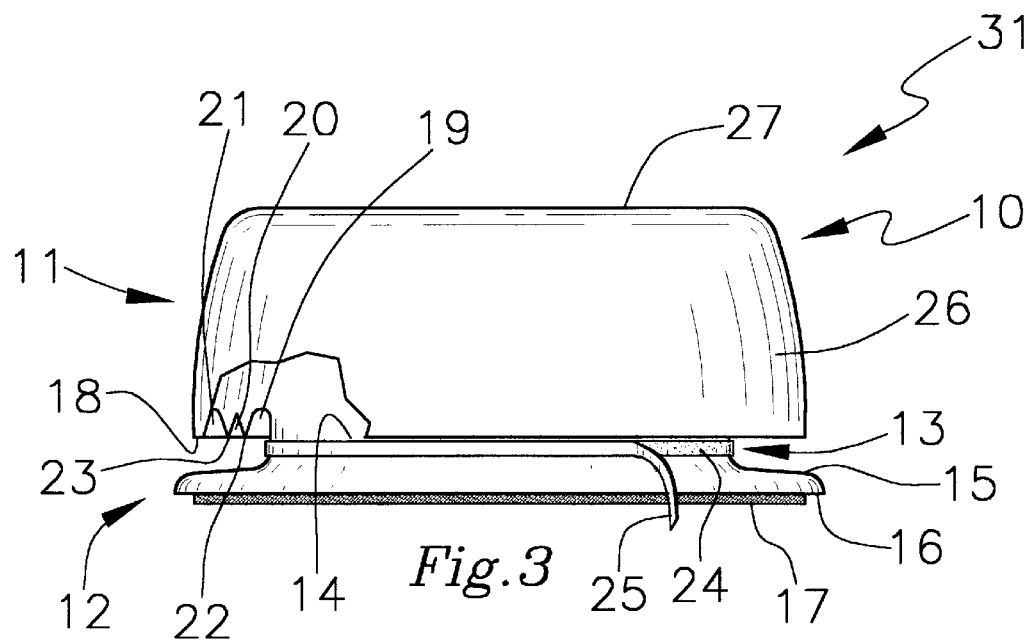
FIG. 3 is a schematic partial breakaway side view of a second preferred embodiment of the present invention.

In a second preferred embodiment 31, as illustrated in FIGS. 3 and 4, the upper face of the top portion is generally hemispherical or an inverted dome-shape and has a upwardly facing concavity downwardly extending from the upper edge of the perimeter side wall towards a central region of the top portion. The concavity of the upper face of the top portion defines a reservoir or dish designed for holding fluid or pet food therein.

In an ideal illustrated embodiment, the pedestal has a height defined between the lower face of the bottom portion and the upper edge of the perimeter side wall between about 2½ inches and about 3 inches. In this ideal illustrated embodiment, the diameter of the pedestal is preferably about 8 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pet dish insect barrier system, comprising:

a pedestal having spaced apart top and bottom portions, and a constricted middle portion interposed between said top and bottom portions of said pedestal;

said top, bottom portions of said pedestal each having an outer perimeter, and upper and lower faces;

said middle portion of said pedestal having an outer side extending therearound;

said lower face of said top portion of said pedestal having a plurality of channels positioned between said outer perimeter of said top portion and said outer side of said middle portion and extending around said outer side of said middle portion;

said outer side of said middle portion having a strip therearound, said strip having an insecticide provided thereon for repelling insects.

2. The pet dish insect barrier system of claim 1, wherein said outer perimeters of said top and bottom portions each having about equal dimensions.

3. The pet dish insect barrier system of claim 1, wherein said outer perimeters of said top and bottom portions each are generally circular, and wherein said outer side of said middle portion is generally cylindrical.

4. The pet dish insect barrier system of claim 1, wherein said lower faces of said top and bottom portions lie in generally parallel planes to each other.

5. The pet dish insect barrier system of claim 4, wherein said upper face of said bottom portion slopes upwards from said outer perimeter of said bottom portion towards said outer side of said middle portion.

6. The pet dish insect barrier system of claim 1, wherein said lower face of said bottom portion has a disk-shape resiliently deformable pad coupled thereto.

7. The pet dish insect barrier system of claim 1, wherein a first of said channels has a generally inverted U-shaped transverse cross section comprising a spaced apart pair of side portions and an arcuate upper connecting portion connecting said side portions of said first channel together, said side portions of said first channel being extended at an acute angle from one another, one of said side portions of said first channel being extended substantially perpendicular to said lower face of said top portion.

8. The pet dish insect barrier system of claim 7, wherein a second of said channels has a generally inverted V-shape transverse cross section comprising a pair of side portions extending at an acute angle from one another.

9. The pet dish insect barrier system of claim 8, wherein a third of said channels has a generally inverted U-shaped transverse cross section comprising a spaced apart pair of side portions and an arcuate upper connecting portion connecting said side portions of said third channel together, said side portions of said third channel being extended at an acute angle from one another, one of said side portions of said third channel being extended substantially perpendicular to said lower face of said top portion.

10. The pet dish insect barrier system of claim 9, wherein said second channel is interposed between said first and third channels, said first channel being positioned adjacent said outer side of said middle portion of said pedestal, said third channel being positioned adjacent said outer perimeter of said top portion of said pedestal.

11. The pet dish insect barrier system of claim 10, wherein one of said side portions of said first channel and a first of said side portions of said second channel converge together at said lower face of said top portion to form a first pointed ridge between said first and second channels, and wherein one of said side portions of said third channel and a second of said side portions of said second channel converge together at said lower face of said top portion to form a second pointed ridge between said second and third channels.

12. The pet dish insect barrier system of claim 1, wherein said channels each have a depth defined upwards from lower face of said top portion, said depths of said channels being substantially equal to one another.

13. The pet dish insect barrier system, wherein said top portion of said pedestal has an upwardly extending perimeter side wall around said upper face of said top portion, said perimeter side wall of said top portion terminating at an upper edge therearound.

14. The pet dish insect barrier system of claim 13, wherein said upper face of said top portion is substantially planar and lies in a plane substantially parallel to said lower face of said top portion and being positioned between said lower face of said top portion and said upper edge of said perimeter side wall of said top portion.

15. The pet dish insect barrier system of claim 14, further comprising a pet dish being rested on said upper face of said top portion such that said perimeter side wall of said top portion extends around said pet dish.

16. The pet dish insect barrier system of claim 13, wherein said upper face of said top portion is generally hemispherical and has a upwardly facing concavity downwardly extending from said upper edge of said perimeter side wall towards a central region of said top portion, said concavity of said upper face of said top portion defining a reservoir.

17. A pet dish insect barrier system, comprising:

a pedestal having spaced apart top and bottom portions, and a constricted middle portion interposed between said top and bottom portions of said pedestal;

said top, bottom portions of said pedestal each having an outer perimeter, and upper and lower faces;

wherein said outer perimeters of said top and bottom portions each having about equal dimensions;

said middle portion of said pedestal having an outer side extending therearound;

wherein said outer perimeters of said top and bottom portions each being generally circular and having about equal outer diameters;

wherein said outer side of said middle portion is generally cylindrical;

said top, bottom, and middle portions having substantially coaxial centers;

said lower faces of said top and bottom portions lying in generally parallel planes to each other;

said upper face of said bottom portion sloping upwards from said outer perimeter of said bottom portion towards said outer side of said middle portion;

said lower face of said bottom portion being adapted for resting on a resting surface;

said lower face of said bottom portion having a disk-shape resiliently deformable pad coupled thereto for frictionally enhancing contact between said lower face of said bottom portion and the resting surface;

said pad having a diameter less than said outer diameter of said bottom portion;

said lower face of said top portion of said pedestal having three annular channel positioned between said outer perimeter of said top portion and said outer side of said middle portion and extending around said outer side of said middle portion;

a first of said channels having a generally inverted U-shaped transverse cross section comprising a spaced apart pair of side portions and an arcuate upper connecting portion connecting said side portions of said first channel together;

said side portions of said first channel being extended at an acute angle from one another, one of said side portions of said first channel being extended substantially perpendicular to said lower face of said top portion;

a second of said channels having a generally inverted V-shape transverse cross section comprising a pair of side portions extending at an acute angle from one another;

a third of said channels having a generally inverted U-shaped transverse cross section comprising a spaced apart pair of side portions and an arcuate upper connecting portion connecting said side portions of said third channel together;

said side portions of said third channel being extended at an acute angle from one another, one of said side portions of said third channel being extended substantially perpendicular to said lower face of said top portion;

said second channel being interposed between said first and third channels, said first channel being positioned adjacent said outer side of said middle portion of said pedestal, said third channel being positioned adjacent said outer perimeter of said top portion of said pedestal;

one of said side portions of said first channel and a first of said side portions of said second channel converging together at said lower face of said top portion to form a first pointed ridge between said first and second channels;

one of said side portions of said third channel and a second of said side portions of said second channel converging together at said lower face of said top portion to form a second pointed ridge between said second and third channels;

said channels each having a depth defined upwards from lower face of said top portion, said depths of said channels being substantially equal to one another;

said outer side of said middle portion having an annular strip therearound, said annular strip having an insecticide provided thereon; and said top portion of said pedestal having an upwardly extending perimeter side wall around said upper face of said top portion, said perimeter side wall of said top portion terminating at an upper edge therearound, said upper edge of said perimeter side wall of said top portion lying in a plane substantially parallel to said plane of lower face of said top portion.

18. The pet dish insect barrier system of claim 17, wherein said upper face of said top portion is substantially planar and lying in a plane substantially parallel to said lower face of said top portion and being positioned between said planes of said lower face of said top portion and said upper edge of said perimeter side wall of said top portion, and further comprising a pet dish being rested on said upper face of said top portion such that said perimeter side wall of said top portion extends around said pet dish.

19. The pet dish insect barrier system of claim 17, wherein said upper face of said top portion is generally hemispherical and has a upwardly facing concavity downwardly extending from said upper edge of said perimeter side wall towards a central region of said top portion.

* * * * *